(12) United States Patent
Ishibashi et al.

(10) Patent No.: US 10,627,306 B2
(45) Date of Patent: Apr. 21, 2020

(54) GLASS PANEL UNIT AND INSPECTION METHOD THEREOF

(71) Applicant: PANASONIC INTELLECTUAL PROPERTY MANAGEMENT CO., LTD., Osaka (JP)

(72) Inventors: Tasuku Ishibashi, Osaka (JP); Eiichi Uriu, Osaka (JP); Hiroyuki Abe, Osaka (JP); Kenji Hasegawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 48 days.

(21) Appl. No.: 15/512,819

(22) PCT Filed: Sep. 17, 2015

(86) PCT No.: PCT/JP2015/004775
§ 371 (c)(1),
(2) Date: Mar. 20, 2017

(87) PCT Pub. No.: WO2016/051714
PCT Pub. Date: Apr. 7, 2016

(65) Prior Publication Data
US 2017/0292892 A1  Oct. 12, 2017

(30) Foreign Application Priority Data

Sep. 30, 2014 (JP) .................................. 2014-200975

(51) Int. Cl.
*G01N 21/78* (2006.01)
*G01M 3/02* (2006.01)
(Continued)

(52) U.S. Cl.
CPC .............. *G01M 3/02* (2013.01); *C03C 27/06* (2013.01); *G01L 21/00* (2013.01); *G01N 7/04* (2013.01); *G01N 21/783* (2013.01)

(58) Field of Classification Search
CPC ......... G01L 21/00; G01M 3/02; G01N 21/78; G01N 21/783; G01N 7/04; C03C 27/06
(Continued)

(56) References Cited

U.S. PATENT DOCUMENTS

| 2,756,467 | A |   | 7/1956 | Etling |   |
|---|---|---|---|---|---|
| 4,213,044 | A | * | 7/1980 | Perrotta | ............... G01N 21/643 250/301 |

(Continued)

FOREIGN PATENT DOCUMENTS

| CA | 2258585 A1 | 12/1997 |
|---|---|---|
| JP | S59-042288 U | 3/1984 |

(Continued)

OTHER PUBLICATIONS

International Search Report and Written Opinion issued in International Patent Application No. PCT/JP2015/004775, dated Dec. 28, 2015; with partial English translation.

(Continued)

*Primary Examiner* — Maureen Wallenhorst
(74) *Attorney, Agent, or Firm* — McDermott Will & Emery LLP

(57) ABSTRACT

The glass panel unit includes: a first glass panel; a second glass panel; a seal; an evacuated space; and a gas adsorbent. The seal with a frame shape hermetically bonds the first glass panel and the second glass panel to each other. The gas adsorbent is placed in the evacuated space. The gas adsorbent includes a getter. The gas adsorbent is visible through (Continued)

US 10,627,306 B2

Page 2 at least one of the first glass panel and the second glass panel. The gas adsorbent has properties of changing its color when adsorbing gas.

2 Claims, 10 Drawing Sheets

(51) Int. Cl.
C03C 27/06 (2006.01)
G01N 7/04 (2006.01)
G01L 21/00 (2006.01)

(58) Field of Classification Search
USPC .... 436/2, 3, 72, 73, 80, 164, 165, 167, 181; 422/400, 401, 402, 86, 88, 547, 554
See application file for complete search history.

(56) References Cited

U.S. PATENT DOCUMENTS

| 2012/0269996 | A1  | 10/2012 | Jager |           |
|--------------|-----|---------|-------|-----------|
| 2017/0274353 | A1* | 9/2017  | Ishibashi | B01J 20/28 |
| 2017/0298681 | A1* | 10/2017 | Abe   | C03C 27/10 |
| 2017/0328124 | A1* | 11/2017 | Abe   | C03C 27/06 |

FOREIGN PATENT DOCUMENTS

| JP | S61-122387 A   | 6/1986  |
| JP | 2000-512333 A  | 9/2000  |
| JP | 2000-302490 A  | 10/2000 |
| JP | 2003-082946 A  | 3/2003  |
| JP | 2006-083675 A  | 3/2006  |
| JP | 2008-019131 A  | 1/2008  |
| JP | 2008-063158 A  | 3/2008  |
| JP | 2009-167041 A  | 7/2009  |
| JP | 2013-514245 A  | 4/2013  |
| JP | 2014-040361 A  | 3/2014  |
| WO | 2011/072646 A2 | 6/2011  |

OTHER PUBLICATIONS

Extended European Search Report issued in corresponding European Patent Application No. 15847988.1, dated Sep. 7, 2017.

* cited by examiner

GLASS PANEL UNIT AND INSPECTION METHOD THEREOF

RELATED APPLICATIONS

This application is the U.S. National Phase under 35 U.S.C. § 371 of International Patent Application No. PCT/JP2015/004775, filed on Sep. 17, 2015, which in turn claims the benefit of Japanese Application No. 2014-200975, filed on Sep. 30, 2014, the disclosures of which Applications are incorporated by reference herein.

TECHNICAL FIELD

The present disclosure relates to a glass panel unit and an inspection method thereof. In particular, the glass panel unit includes an evacuated space between a pair of glass panels.

BACKGROUND ART

There has been known a glass panel unit in which two or more glass panels are stacked with one or more gaps in-between to form one or more hermetically enclosed spaces, and the spaces are made to be in a vacuum state. This type of glass panel unit is also referred to as a multiple glass panel. This glass panel unit has high thermal insulating properties. It is important that the glass panel unit keeps the vacuum state.

There has been proposed use of a getter to maintain the vacuum state of the glass panel unit. The getter is a substance capable of adsorbing gas. For example, JP 2013-514245 A (WO 2011/072646 A1) discloses techniques of using stacked glass plates with different sizes and providing the getter on a periphery of one glass plate which is not covered with the other. However, according to the techniques of the document, the getter protrudes laterally, and this may lead to a poor appearance and a decrease in handleability.

SUMMARY OF INVENTION

An objective of the present disclosure would be to propose a glass panel unit maintaining a vacuum state and an inspection method thereof.

The glass panel unit of the present disclosure includes: a first glass panel; a second glass panel; a seal; an evacuated space; and a gas adsorbent. The second glass panel is placed opposite the first glass panel. The seal with a frame shape is placed between the first glass panel and the second glass panel to hermetically bond the first glass panel and the second glass panel to each other. The evacuated space is enclosed by the first glass panel, the second glass panel, and the seal. The gas adsorbent is placed in the evacuated space and including a getter. The gas adsorbent is visible through at least one of the first glass panel and the second glass panel. The gas adsorbent has properties of changing its color when adsorbing gas.

The inspection method of glass panel unit of the present disclosure includes determining a degree of vacuum of the evacuated space based on change in color of the gas adsorbent.

The glass panel unit of the present disclosure allows easily determining the degree of vacuum of the evacuated space based on change in the color. Therefore, it is possible to check whether the vacuum state is maintained, and therefore the glass panel unit maintaining the vacuum state can be provided.

The inspection method of glass panel unit of the present disclosure allows easily determining the degree of vacuum of the evacuated space based on change in the color. Therefore, it is possible to check whether the vacuum state is maintained, and therefore the glass panel unit maintaining the vacuum state can be provided.

DESCRIPTION OF EMBODIMENTS

Figure 1:
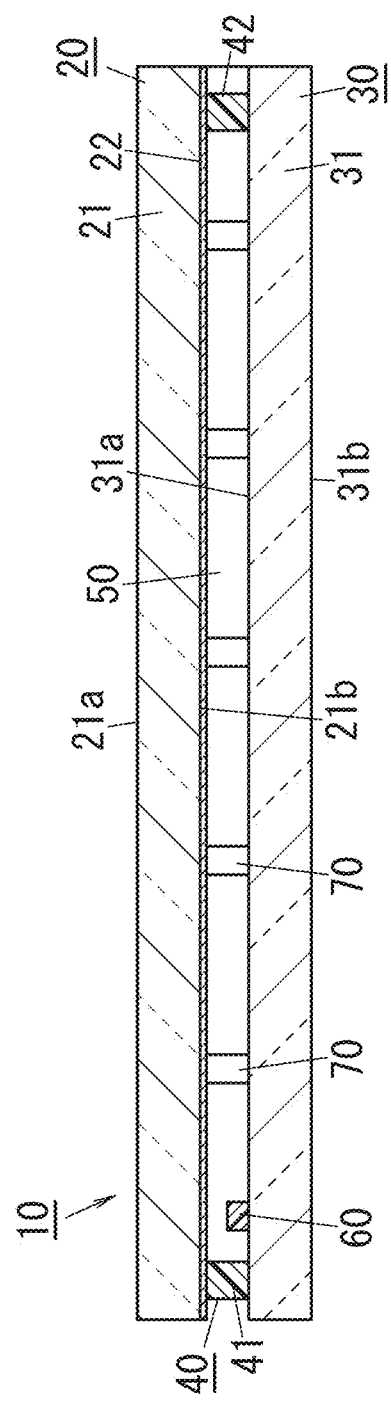
FIG. 1 is a schematic section of the glass panel unit of one example.
Figure 2:
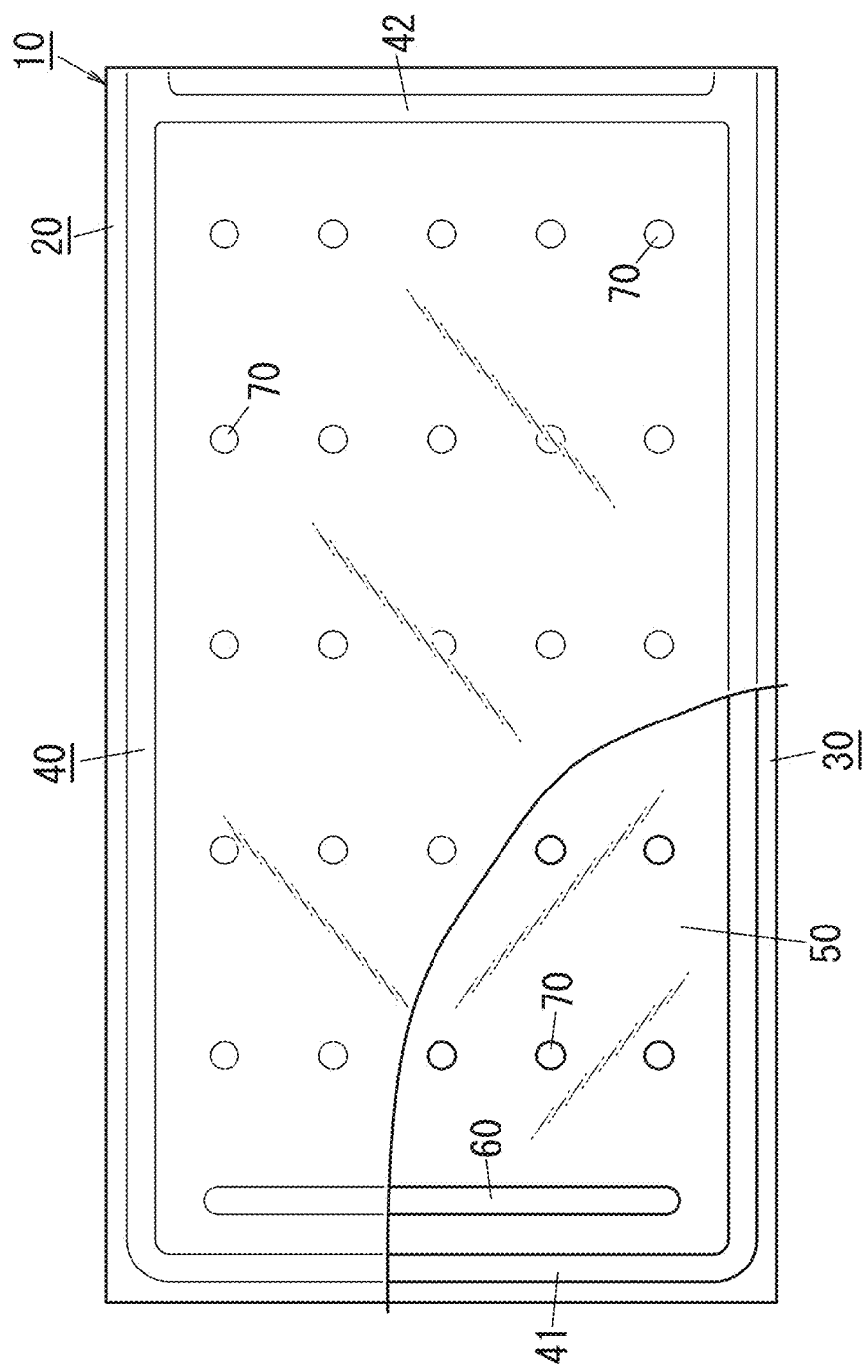
FIG. 2 is a schematic plan of the glass panel unit of the example.

FIG. 1 and FIG. 2 show a glass panel unit 10 of one embodiment. The glass panel unit 10 of the present embodiment is a vacuum insulated glass unit. The vacuum insulated glass unit is a type of multiple glass panels including at least one pair of glass panels, and includes an evacuated space 50 between the pair of glass panels. Note that, in FIG. 2, to facilitate understanding of the internal structure only, the first glass panel 20 is illustrated with part (left and lower part) thereof being cutaway. Note that, directions (upward, downward, left, and right directions) in the figures are determined based on a direction of reference numbers in the same figures (a direction allowing reading the reference numbers).

The glass panel unit 10 includes the first glass panel 20, a second glass panel 30, a seal 40, the evacuated space 50, and a gas adsorbent 60. The second glass panel 30 is placed opposite the first glass panel 20. The seal 40 with a frame shape is placed between the first glass panel 20 and the second glass panel 30. The seal 40 hermetically bonds the first glass panel 20 and the second glass panel 30 to each other. The evacuated space 50 is enclosed by the first glass panel 20, the second glass panel 30, and the seal 40. The gas adsorbent 60 is placed in the evacuated space 50. The gas adsorbent 60 includes a getter. The gas adsorbent 60 is visible through at least one of the first glass panel 20 and the second glass panel 30. The gas adsorbent 60 has properties of changing its color when adsorbing gas.

The glass panel unit 10 allows easily determining the degree of vacuum of the evacuated space 50 based on change in the color. Therefore, it is possible to check whether the vacuum state is maintained, and therefore the glass panel unit 10 maintaining the vacuum state can be provided.

The first glass panel 20 includes a body 21 determining a plan shape of the first glass panel 20, and a coating 22. The body 21 is rectangular and includes a first face 21a (external face; upper face in FIG. 1) and a second face 21b (internal face; lower face in FIG. 1) in a thickness direction which are parallel to each other. Each of the first face 21a and the second face 21b of the body 21 is a flat face. Examples of material of the body 21 of the first glass panel 20 may include soda lime glass, high strain point glass, chemically strengthened glass, non-alkaline glass, quartz glass, neoceram, and physically strengthened glass. Note that, the first glass panel 20 may not include the coating 22. The first glass panel 20 may be constituted by the body 21 only.

The coating 22 is formed on the second face 21b of the body 21. The coating 22 may preferably be an infrared reflective film. Note that, the coating 22 is not limited to such an infrared reflective film but may be a film with desired physical properties.

The second glass panel 30 includes a body 31 determining a plan shape of the second glass panel 30. The body 31 is rectangular and includes a first face 31a (internal face; lower face in FIG. 1) and a second face 31b (external face; upper face in FIG. 1) in a thickness direction which are parallel to each other. Each of the first face 31a and the second face 31b of the body 31 is a flat face. Examples of material of the body 31 of the second glass panel 30 may include soda lime glass, high strain point glass, chemically strengthened glass, non-alkaline glass, quartz glass, neoceram, and physically strengthened glass. The material of the body 31 may be same as the material of the body 21. The body 31 has the same plan shape with the body 21. Stated differently, the second glass panel 30 has the same plan shape with the first glass panel 20.

The second glass panel 30 includes the body 31 only. In other words, the body 31 forms the second glass panel 30 by itself. The second glass panel 30 may include a coating. The coating may be formed on the first face of the body 31. This coating may have properties same as the coating 22 of the first glass panel 20.

The first glass panel 20 and the second glass panel 30 are arranged so that the second face 21b of the body 21 and the first face 31a of the body 31 face and parallel to each other. In other words, the first face 21a of the body 21 is directed outward from the glass panel unit 10, and the second face 21b of the body 21 is directed inward of the glass panel unit 10. Further, the first face 31a of the body 31 is directed inward of the glass panel unit 10, and the second face 31b of the body 31 is directed outward from the glass panel unit 10.

The seal 40 encloses the evacuated space 50 completely and bonds the first glass panel 20 and the second glass panel 30 to each other hermetically. The seal 40 has a rectangular frame shape. The evacuated space 50 has a degree of vacuum equal to or lower than a predetermined value. The predetermined value may be 0.1 Pa, for example. The evacuated space 50 may be formed by evacuation. The evacuation may include forming a hole for evacuation in at least one of the first glass panel 20, the second glass panel 30, and the seal 40 and removing gas from an inside. However, it is preferable that both the first glass panel 20 and the second glass panel 30 do not include any outlet by the following evacuation. In this case, it is possible to produce the glass panel unit 10 with an improved appearance.

The seal 40 is formed of thermal adhesive. Examples of the thermal adhesive may include glass frit. Examples of the glass frit may include low-melting-point glass frit. Examples of the low-melting-point glass frit may include bismuth-based glass frit, lead-based glass frit, and vanadium-based glass frit. The seal 40 may be made of multiple thermal adhesives, as described below.

As shown in FIG. 1 and FIG. 2, the glass panel unit 10 further includes multiple spacers 70. The multiple spacers 70 are used to keep a predetermined interval between the first glass panel 20 and the second glass panel 30. The multiple spacers 70 allow reliably ensuring the space between the first glass panel 20 and the second glass panel 30.

The multiple spacers 70 are placed inside the evacuated space 50. In more detail, the multiple spacers 70 are placed at individual intersections of an imaginary rectangular lattice. For example, an interval between the multiple spacers 70 may be in a range of 1 to 10 cm, and in one example may be 2 cm. Note that, sizes of the spacers 70, the number of spacers 70, intervals between the spacers 70, and pattern of arrangement of the spacers 70 may be appropriately determined.

Each spacer 70 has a solid cylindrical shape with a height almost equal to the aforementioned predetermined interval (interval between the first glass panel 20 and the second glass panel 30). For example, each spacer 70 may have a diameter ranging from 0.1 to 10 mm and a height ranging from 10 to 1000 µm. In one example, each spacer 70 may have a diameter of 1 mm and a height of 100 µm. Note that, each spacer 70 may have a desired shape such as a solid prismatic shape and a spherical shape. The heights of the multiple spacers 70 determine the distance between the first glass panel 20 and the second glass panel 30 which means a thickness of the evacuated space 50. The evacuated space 50 may have a thickness ranging from 10 to 1000 µm, and in one example may have a thickness of 100 µm.

Each spacer 70 is made of light-transmissive material. Thus, the multiple spacers 70 are unlikely to be perceived. Note that, each spacer 70 may be made of opaque material, providing that it is sufficiently small. Material of the spacers 70 is selected so that deformation of the spacers 70 does not occur during a first melting step, an evacuating step, and a second melting step which are described later. For example, the material of the spacers 70 is selected to have a softening point (softening temperature) higher than a first softening point of a first thermal adhesive and a second softening point of a second thermal adhesive.

The gas adsorbent 60 is placed inside the evacuated space 50. In the present embodiment, the gas adsorbent 60 has an elongated shape. The gas adsorbent 60 is formed on a second end (left end in FIG. 2) in the lengthwise direction of the second glass panel 30 to extend along the width direction of the second glass panel 30. In summary, the gas adsorbent 60 is placed on one end of the evacuated space 50. According to this arrangement, the gas adsorbent 60 can be unlikely to be perceived. In a case of directly placing the gas adsorbent 60 on a glass panel, placement of the gas adsorbent 60 can be facilitated. Note that, the gas adsorbent 60 may be provided in any position in the evacuated space 50. For example, the gas adsorbent 60 may be provided to the second glass panel 30 likewise the present embodiment, or may be provided to the first glass panel 20. Additionally, the gas adsorbent 60 may be in contact with the seal 40. It is sufficient that the gas adsorbent 60 is placed visible from the outside.

The gas adsorbent 60 is used to adsorb unnecessary gas (for example, residual gas). The unnecessary gas may include gas emitted in forming the seal 40. The unnecessary gas may further include gas intruding into an inside through a gap in the seal 40. An increase in such gas may cause a decrease the degree of vacuum and thus a decrease in the thermal insulating properties.

The gas adsorbent 60 includes a getter. The getter is a substance having properties of adsorbing molecules smaller than a predetermined size. The getter may be an evaporative getter. The evaporative getter has properties of desorbing adsorbed molecules when having a temperature equal to or higher than a predetermined temperature (activation temperature). Therefore, even if the adsorbability of the evaporative getter has been decreased, the adsorbability of the evaporative getter can be recovered by heating the evaporative getter to a temperature equal to or higher than the activation temperature. Examples of the evaporative getter may include zeolite and ion-exchanged zeolite.

The gas adsorbent 60 includes a powder of this getter. In more detail, the gas adsorbent 60 may be formed by: applying a liquid containing a powder of the getter; and solidifying it. Examples of the liquid containing a powder of the getter may include dispersion liquid prepared by dispersing a powder of the getter in a liquid and a solution prepared by dissolving a powder of the getter in a liquid. In this case, the gas adsorbent 60 can be downsized. Therefore, the gas adsorbent 60 can be placed even if the evacuated space 50 is small.

The gas adsorbent 60 is visible through at least one of the first glass panel 20 and the second glass panel 30. In FIG. 1 and FIG. 2, the gas adsorbent 60 is visible through each of both the first glass panel 20 and the second glass panel 30. As described above, the gas adsorbent 60 is visible and therefore it is possible to facilitate determining change in color. Such change in color can be checked through at least one of the first glass panel 20 and the second glass panel 30.

The gas adsorbent 60 has properties of changing its color when adsorbing gas. Change in color of the getter may cause change in color of the gas adsorbent 60. The gas adsorbent 60 may have such properties that the color changes gradually according to an amount of adsorbed gas. Or, the gas adsorbent 60 may have such properties that the color changes sharply when an amount of adsorbed gas reaches a predetermined amount. The color change can be observed by optical measurement. Examples of an index therefor may include a color difference and chromaticity. It is preferable that the color change can be observed with the naked eyes. Thereby, check of adsorption of gas can be facilitated.

The zeolite is particularly preferable for the getter. The zeolite is excellent in gas adsorption properties. Further, the zeolite may include multiple fine pores. Such multiple fine pores may cause an increase in the surface area. The multiple fine pores can take in gas. The zeolite with multiple fine pores tends to show high gas adsorption properties.

The zeolite has a three-dimensional structure where silicon (Si) and aluminum (Al) is bonded through oxygen (O), and thus is electrically neutral. Therefore, the zeolite can hold a cation in its skeleton (backbone). Examples of the cation in the zeolite may include a sodium ion ($Na^+$). Exchange of the cation may cause an increase in change of the color. Therefore, the zeolite is preferably metal ion-exchanged zeolite. Change in the color can be increased due to exchange of the metal ion. The metal ion may preferably have properties of increasing change in the color. The getter may in particular preferably include copper ion-exchanged zeolite. The copper ion-exchanged zeolite can increase a degree of change in the color. The copper ion-exchanged zeolite is zeolite containing a copper ion. The copper ion can be introduced into the zeolite by cation exchange.

Hereinafter, a method for manufacturing the glass panel unit 10. FIG. 3 to FIG. 9 show an example of the method for manufacturing the glass panel unit 10. The glass panel unit 10 shown in FIG. 1 and FIG. 2 can be produced by the method illustrated in FIG. 3 to FIG. 9.

Figure 3:
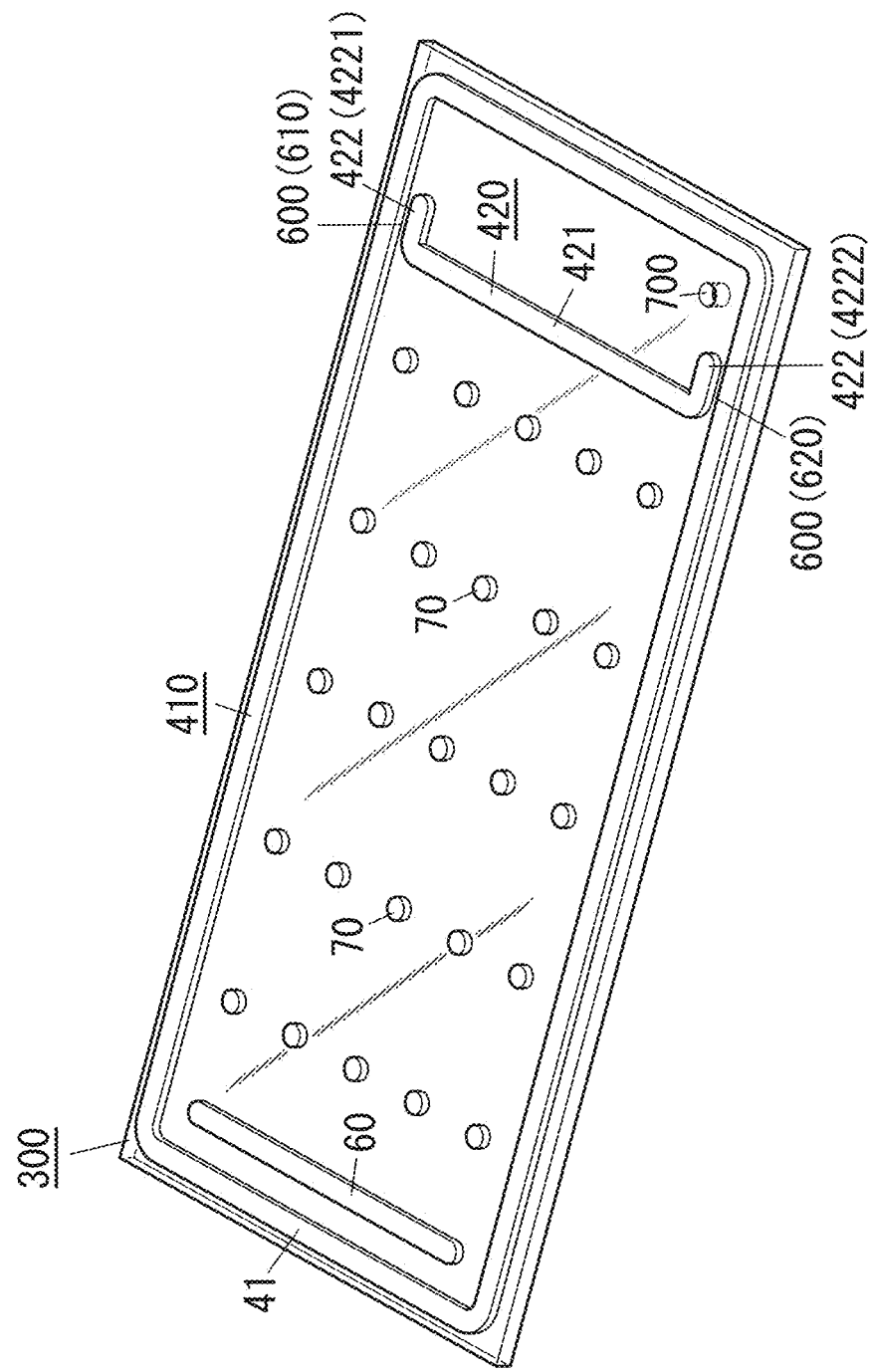
FIG. 3 is a perspective view of the glass panel unit at a step of a method for manufacturing the same thereof.
Figure 4:
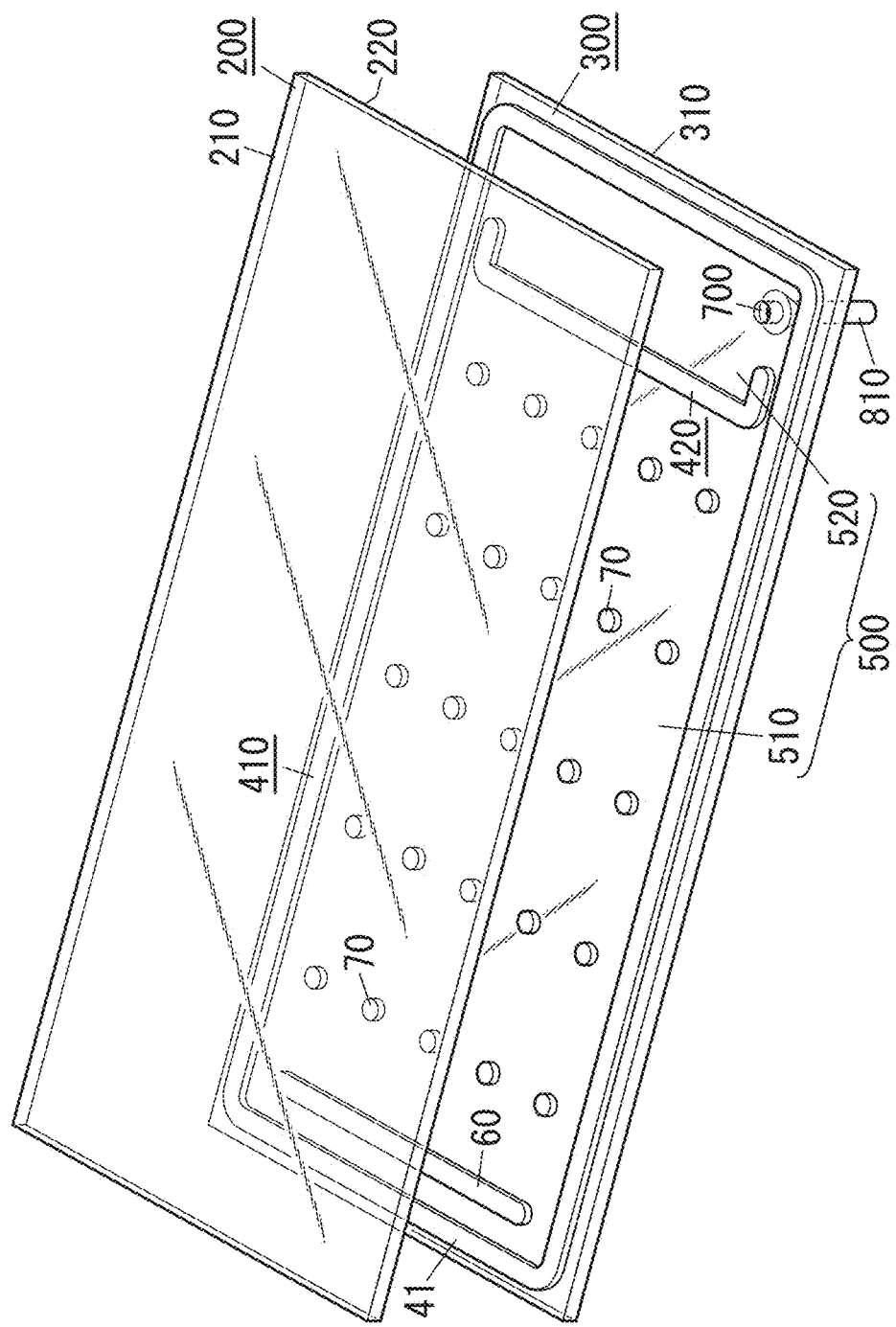
FIG. 4 is a perspective view of the glass panel unit at another step of the method for manufacturing the same.
Figure 5:
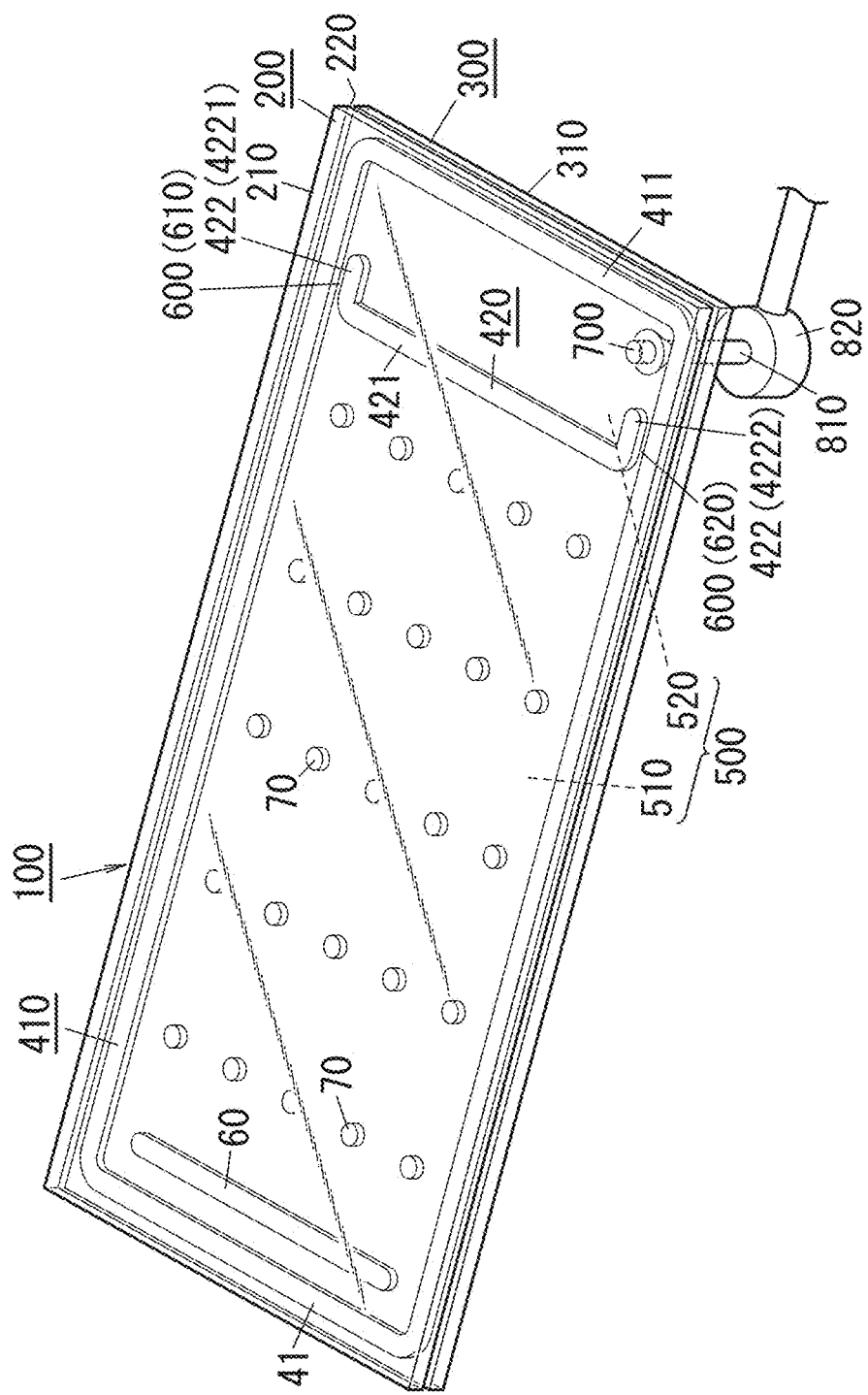
FIG. 5 is a perspective view of the glass panel unit at another step of the method for manufacturing the same.
Figure 6:
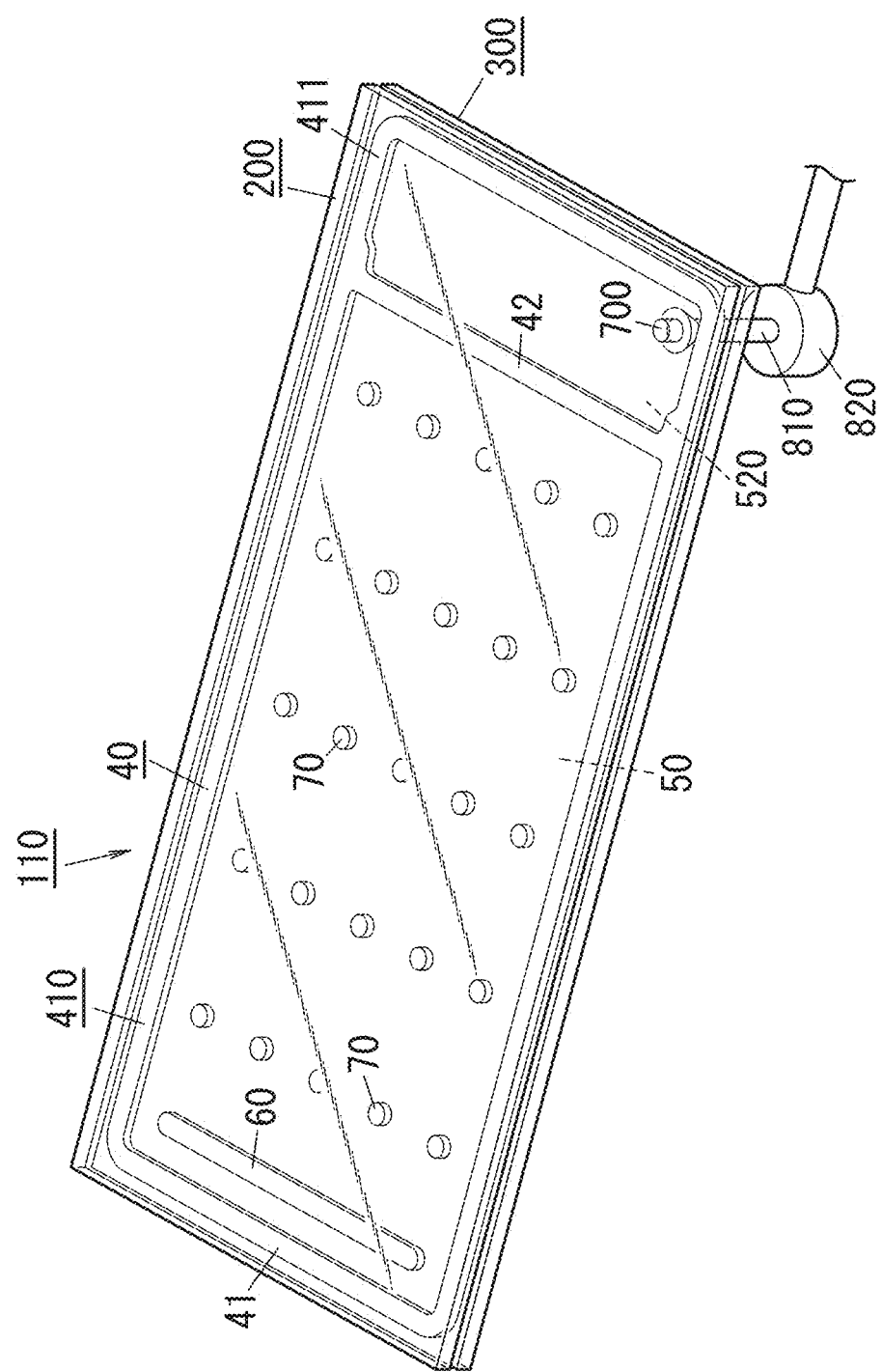
FIG. 6 is a perspective view of the glass panel unit at another step of the method for manufacturing the same.
Figure 7:
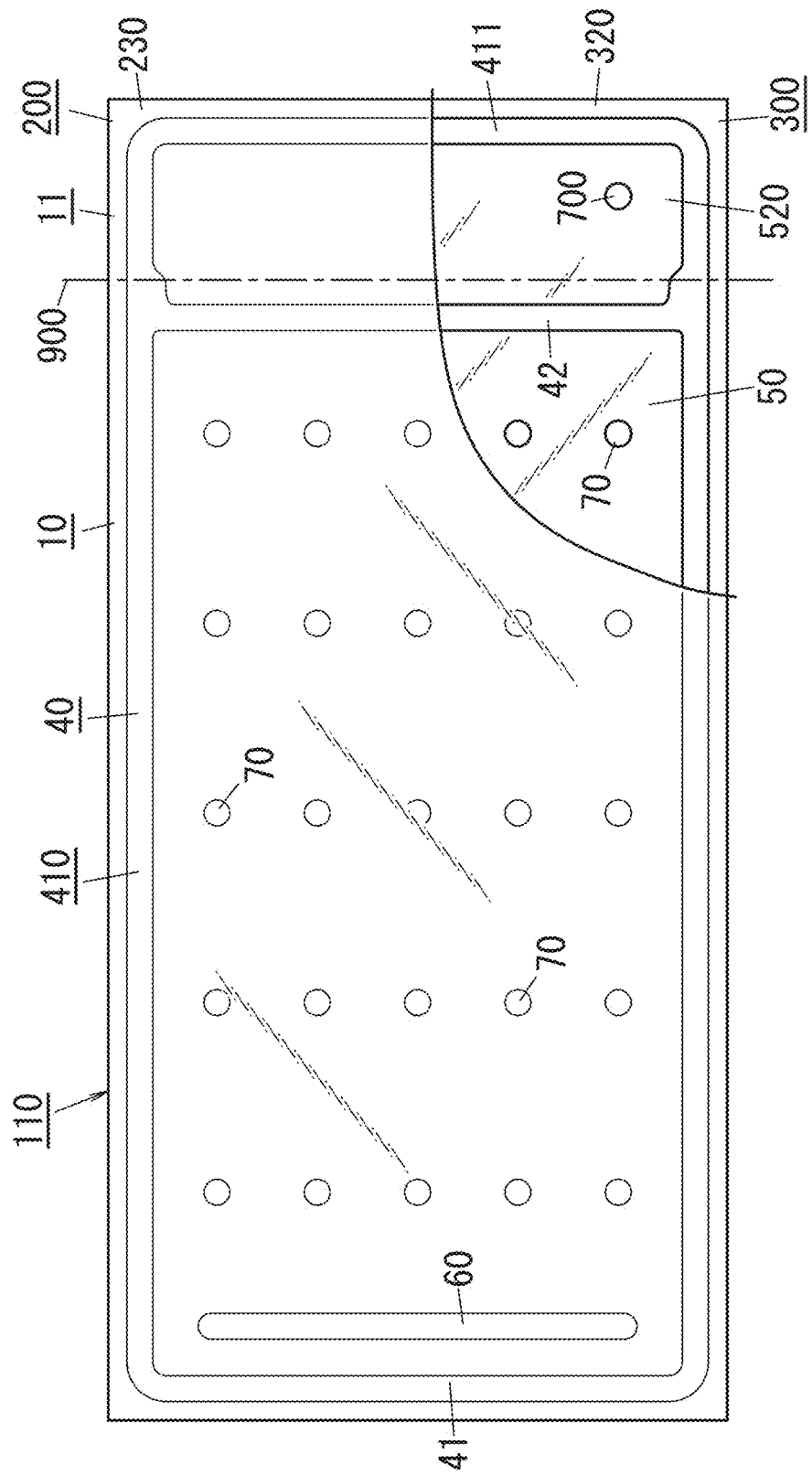
FIG. 7 is a schematic plan of the completed assembly of the glass panel unit.
Figure 8:
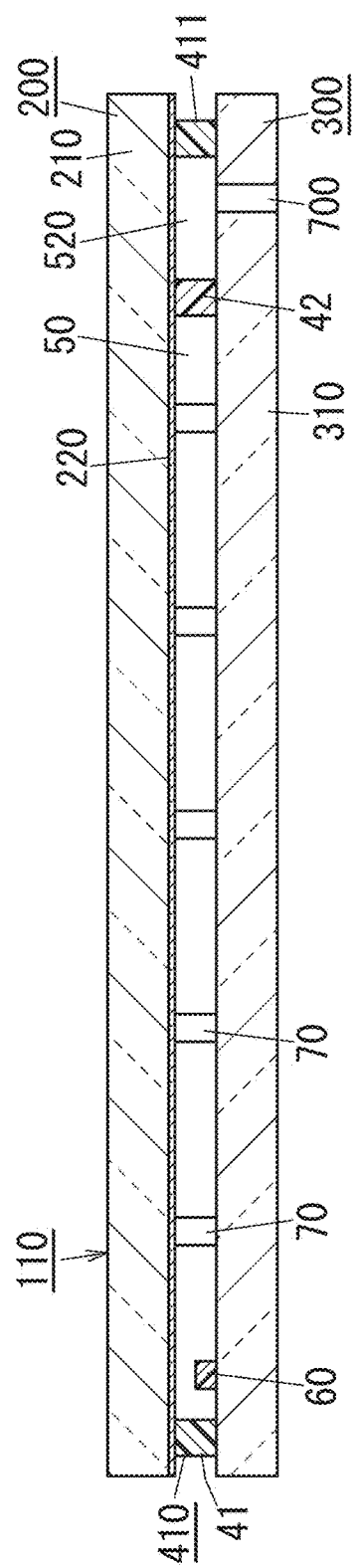
FIG. 8 is a schematic section of the completed assembly of the glass panel unit.
Figure 9:
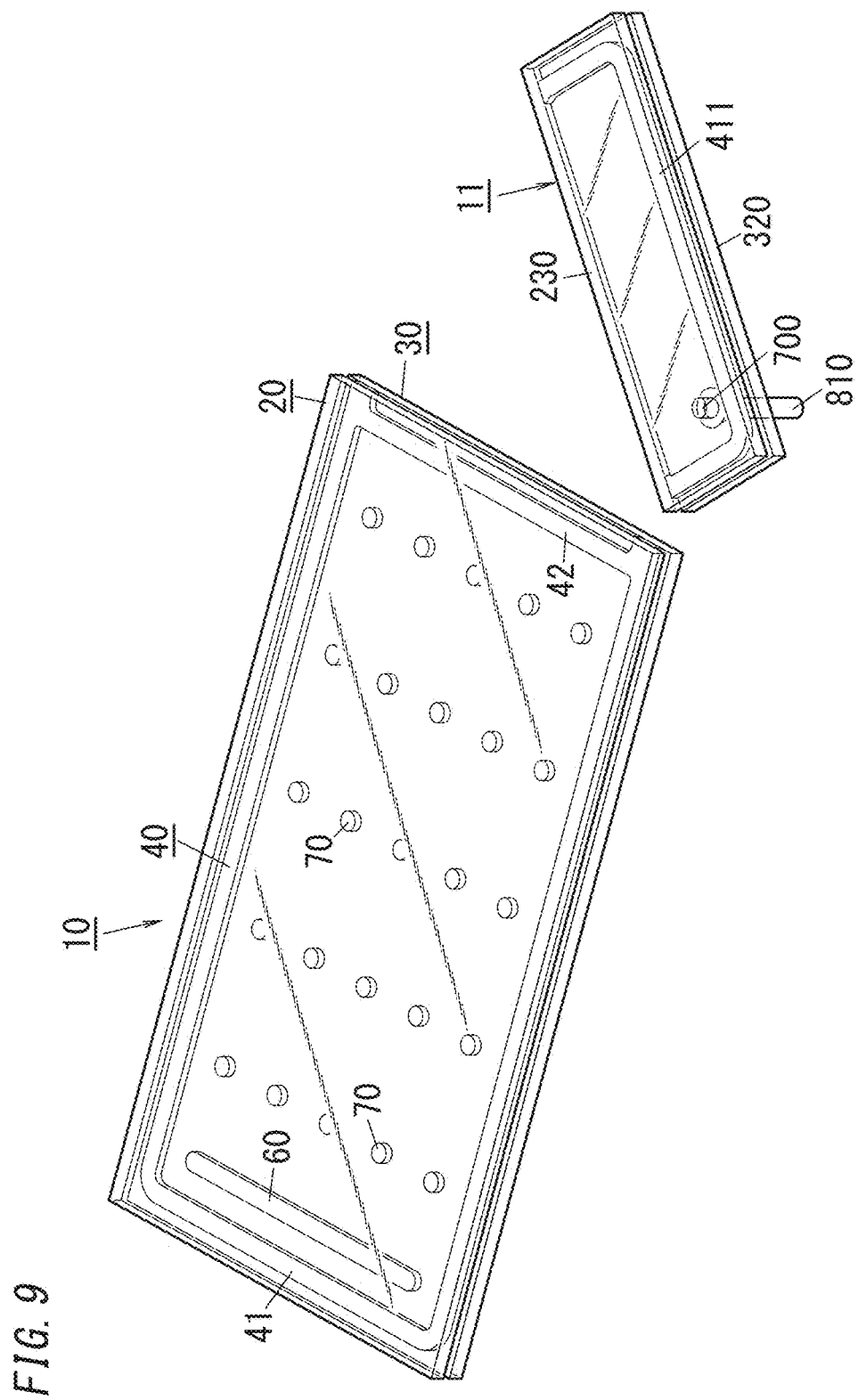
FIG. 9 is a perspective view of the glass panel unit at another step of the method for manufacturing the same.

To produce the glass panel unit 10, first of all a temporary assembly 100 is prepared as shown in FIG. 3 to FIG. 5 and subsequently a completed assembly 110 shown in FIG. 6 to FIG. 8 is prepared by a predetermined process. Thereafter, as shown in FIG. 9, the glass panel unit 10 can be obtained by cutting a particular part from the completed assembly 110.

The method for manufacturing the glass panel unit 10 includes a preparation step, an assembling step, a hermetically enclosing step, and a removing step. Note that, the preparation step can be omitted.

The preparation step is a step of preparing a first glass substrate 200, a second glass substrate 300, a frame 410, a partition 420, the gas adsorbent 60, and the multiple spacers 70. According to the preparation step, an inside space 500, a gas passage 600, and an outlet 700 can be formed.

The first glass substrate 200 is a substrate to give the first glass panel 20. As shown in FIG. 8, the first glass substrate 200 includes a glass plate 210 determining a plan shape of the first glass substrate 200, and a coating 220. The glass plate 210 is a rectangular flate plate and includes a first face and a second face in a thickness direction which are parallel to each other. The coating 220 is formed on the second face of the glass plate 210. The glass plate 210 forms the body 21 of the first glass panel 20. The first face of the glass plate 210 corresponds to the first face 21a of the body 21, and the second face of the glass plate 210 corresponds to the second face 21b of the body 21. The coating 220 forms the coating 22 of the first glass panel 20. Note that, the coating 220 may be optional.

The second glass substrate 300 is a substrate to give the second glass panel 30. As shown in FIG. 8, the second glass substrate 300 includes a glass plate 310 determining a plan shape of the second glass substrate 300. The glass plate 310 is a rectangular flat plate and includes a first face and a second face in a thickness direction which are parallel to each other. The second glass substrate 300 serves as a base for the body 31 of the second glass panel 30. The first face of the glass plate 310 corresponds to the first face 31a of the body 31, and the second face of the glass plate 310 corresponds to the second face 31b of the body 31. The glass plate 310 has the same plan shape and plan size as the glass plate 210. In other words, the second glass substrate 300 has the same plan shape as the first glass substrate 200. Further, the glass plate 310 has the same thickness as the glass plate 210. The second glass substrate 300 includes the glass plate 310 only. In other words, the glass plate 310 forms the second glass substrate 300 by itself.

The second glass substrate 300 is placed opposite the first glass substrate 200. In more detail, the first glass substrate 200 and the second glass substrate 300 are arranged so that the second face of the glass plate 210 and the first face of the glass plate 310 face and parallel to each other.

The frame 410 is placed between the first glass substrate 200 and the second glass substrate 300 to hermetically bond the first glass substrate 200 and the second glass substrate 300 to each other. Thereby, as shown in FIG. 5, the inside space 500 enclosed by the frame 410, the first glass substrate 200, and the second glass substrate 300 is formed.

The frame 410 is formed of thermal adhesive (the first thermal adhesive with the first softening point). Examples of the first thermal adhesive may include glass frit. Examples of the glass frit may include low-melting-point glass frit.

Examples of the low-melting-point glass frit may include bismuth-based glass frit, lead-based glass frit, and vanadium-based glass frit.

The frame 410 has a rectangular frame shape. The frame 410 has the same plan shape as each of the glass plates 210 and 310, but the frame 410 has a smaller plan size than each of the glass plates 210 and 310. As shown in FIG. 3, the frame 410 is formed to extend along an outer periphery of the second glass substrate 300. In other words, the frame 410 is formed to cover an almost entire region on the second glass substrate 300.

The partition 420 is placed inside the inside space 500. As shown in FIG. 5, the partition 420 divides the inside space 500 into an evacuation space 510 and a gas passage space 520. The evacuation space 510 is a space to be evacuated later, and the gas passage space 520 is a space used for evacuating the evacuation space 510. The partition 420 is formed between a first end (right end in FIG. 3) and a center of the second glass substrate 300 in a lengthwise direction (left and right direction in FIG. 3) of the second glass substrate 300 so that the evacuation space 510 is larger than the gas passage space 520.

The partition 420 includes a wall part 421 and a pair of closing parts 422 (a first closing part 4221 and a second closing part 4222). The wall part 421 is formed to extend along a width direction of the second glass substrate 300. In FIG. 5, the width direction means a direction extending along a short side of the temporary assembly 100 with a rectangular shape. Note that, the wall part 421 has opposite ends in a lengthwise direction not in contact with the frame 410. The pair of closing parts 422 extends from the opposite ends in the lengthwise direction of the wall part 421 toward the first end in the lengthwise direction of the second glass substrate 300.

The partition 420 is formed of thermal adhesive (the second thermal adhesive with the second softening point). Examples of the second thermal adhesive may include glass frit. Examples of the glass frit may include low-melting-point glass frit. Examples of the low-melting-point glass frit may include bismuth-based glass frit, lead-based glass frit, and vanadium-based glass frit. The second thermal adhesive is same as the first thermal adhesive, and the second softening point is equal to the first softening point.

The gas adsorbent 60 is placed inside the evacuation space 510. In more detail, the gas adsorbent 60 is placed on one end of the evacuation space 510. Further, the gas adsorbent 60 is positioned away from the partition 420 and the gas passage 600. Hence, it is possible to lower a probability that the gas adsorbent 60 prevents evacuation of the evacuation space 510.

The multiple spacers 70 are already described with reference to FIG. 1 and FIG. 2. As shown in FIG. 3, the multiple spacers 70 are arranged at predetermined intervals in longitudinal and lateral directions.

The gas passage 600 interconnects the evacuation space 510 and the gas passage space 520 in the inside space 500. The gas passage 600 includes a first gas passage 610 and a second gas passage 620. The first gas passage 610 is a space formed between the first closing part 4221 and part of the frame 410 facing the first closing part 4221. The second gas passage 620 is a space formed between the second closing part 4222 and part of the frame 410 facing the second closing part 4222. As a result of placing the partition 420 as described above, the gas passage 600 is formed.

The outlet 700 is a hole interconnecting the gas passage space 520 and an outside space. The outlet 700 is used for evacuating the evacuation space 510 by way of the gas passage space 520 and the gas passage 600. Therefore, the gas passage 600, the gas passage space 520, and the outlet 700 constitute an evacuation passage for evacuating the evacuation space 510. The outlet 700 is formed in the second glass substrate 300 to interconnect the gas passage space 520 and the outside space. In more detail, the outlet 700 is positioned in a corner of the second glass substrate 300.

The preparation step is performed for the aforementioned members. The preparation step includes first to sixth steps. Note that, the order of the second to sixth steps may be modified.

The first step is a step (substrate formation step) of forming the first glass substrate 200 and the second glass substrate 300. For example, in the first step, the first glass substrate 200 and the second glass substrate 300 are produced. The first step may include cleaning the first glass substrate 200 and the second glass substrate 300 if necessary.

The second step is a step of forming the outlet 700. In the second step, the outlet 700 is formed in the second glass substrate 300. Further, in the second step, the second glass substrate 300 is cleaned if necessary. Note that, the outlet 700 may be formed in the first glass substrate 200.

The third step is a step (sealing material formation step) of forming the frame 410 and the partition 420. In the third step, the material (the first thermal adhesive) of the frame 410 and the material (the second thermal adhesive) of the partition 420 are applied on to the second glass substrate 300 (the first face of the glass plate 310) with a dispenser or the like. Thereafter, the material of the frame 410 and the material of the partition 420 are dried and calcined. For example, the second glass substrate 300 where the material of the frame 410 and the material of the partition 420 are applied is heated at 480° C. for 20 minutes. Note that, the first glass substrate 200 may be heated together with the second glass substrate 300. In other words, the first glass substrate 200 may be heated under the same condition (at 480° C. for 20 minutes) as the second glass substrate 300. By doing so, it is possible to reduce a difference in degree of warp between the first glass substrate 200 and the second glass substrate 300.

The fourth step is a step (spacer formation step) of forming the spacers 70. The fourth step may include placing the multiple spacers 70 in individual predetermined locations on the second glass substrate 300 with a chip mounter. Note that, the multiple spacers 70 are formed in advance. Alternatively, the multiple spacers 70 may be formed by use of photolithography techniques and etching techniques. In this case, the multiple spacers 70 may be made of photo-curable material or the like. Alternatively, the multiple spacers 70 may be formed by use of known thin film formation techniques.

The fifth step is a step (gas adsorbent formation step) of forming the gas adsorbent 60. In the fifth step, a solution where a power of the getter is dispersed is applied to a predetermined location on the second glass substrate 300 and then dried to thereby form the gas adsorbent 60.

When a process from the first step to the fifth step is completed, the second glass substrate 300 is obtained, on which the frame 410, the partition 420, the gas passage 600, the outlet 700, the gas adsorbent 60, and the multiple spacers 70 are formed as shown in FIG. 3.

The sixth step is a step (placing step) of placing the first glass substrate 200 and the second glass substrate 300. In the sixth step, the first glass substrate 200 and the second glass substrate 300 are placed so that the second face of the glass plate 210 and the first face of the glass plate 310 face and are parallel to each other. FIG. 4 shows a step of placing the first glass substrate 200 on the second glass substrate 300. Note that, in the present example, members (for example, the frame 410 and the partition 420) are placed on the second glass substrate 300. Alternatively, such members may be placed on the first glass substrate 200.

The assembling step is a step of preparing the temporary assembly 100. In more detail, in the assembling step, the temporary assembly 100 is prepared by bonding the first glass substrate 200 and the second glass substrate 300 to each other. In other words, the assembling step may be referred to as a step (first melting step) of hermetically bonding the first glass substrate 200 and the second glass substrate 300 to each other with the frame 410.

In the first melting step, the first thermal adhesive is melted once at the predetermined temperature (the first melting temperature) equal to or higher than the first softening point and thereby the first glass substrate 200 and the second glass substrate 300 are hermetically bonded to each other. The first glass substrate 200 and the second glass substrate 300 are hermetically bonded to each other with the frame 410. In more detail, the first glass substrate 200 and the second glass substrate 300 are placed in a furnace and heated at the first melting temperature only for predetermined time (the first melting time).

The first melting temperature and the first melting time are selected so that the first glass substrate 200 and the second glass substrate 300 are hermetically bonded to each other with the thermal adhesive of the frame 410 but the gas passage 600 is not closed by the partition 420. In other words, a lower limit of the first melting temperature is equal to the first softening point, and an upper limit of the first melting temperature is however selected so as not to cause the partition 420 to close the gas passage 600. For example, when the first softening point and the second softening point are 434° C., the first melting temperature is set to 440° C. Further, the first melting time may be 10 minutes, for example. Note that, in the first melting step, the frame 410 may emit gas. However such gas may be adsorbed by the gas adsorbent 60.

Through the aforementioned assembling step (the first melting step), the temporary assembly 100 shown in FIG. 5 can be produced. The temporary assembly 100 includes the first glass substrate 200, the second glass substrate 300, the frame 410, the inside space 500, the partition 420, the gas passage 600, the outlet 700, the gas adsorbent 60, and the multiple spacers 70.

The hermetically enclosing step is a step of subjecting the temporary assembly 100 to the above predetermined process to obtain the completed assembly 110. The hermetically enclosing step includes the evacuating step and a melting step (the second melting step). In other words, the evacuating step and the second melting step constitute the above predetermined process.

The evacuating step is a step of converting the evacuation space 510 into the evacuated space 50 by evacuating it by way of the gas passage 600, the gas passage space 520, and the outlet 700 at the predetermined temperature (the evacuating temperature).

Evacuation can be done by a vacuum pump, for example. As shown in FIG. 5, the vacuum pump is connected to the temporary assembly 100 with the evacuation pipe 810 and a sealing head 820. The evacuation pipe 810 is bonded to the second glass substrate 300 so that an inside of the evacuation pipe 810 is connected to the outlet 700, for example. The sealing head 820 is attached to the evacuation pipe 810, and thereby an inlet of the vacuum pump is connected to the outlet 700.

The first melting step, the evacuating step, and the second melting step are performed with the first glass substrate 200 and the second glass substrate 300 being left in the furnace. In this regard, the frame 410, the partition 420, the gas passage 600, the outlet 700, the gas adsorbent 60, and the multiple spacers 70 are already provided to the second glass substrate 300. Therefore, an evacuation pipe 810 is bonded to the second glass substrate 300 before the first melting step at the latest.

In the evacuating step, the evacuation space 510 is evacuated by way of the gas passage 600, the gas passage space 520, and the outlet 700 at a predetermined evacuating temperature only for predetermined time (evacuation time). The evacuating temperature is set to be higher than the activation temperature (for example, 350° C.) of the getter of the gas adsorbent 60, and also is set to be lower than the first softening point and the second softening point (for example, 434° C.). For example, the evacuating temperature is 390° C. According to the above settings, deformation of the frame 410 and the partition 420 is unlikely to occur. Further, the getter of the gas adsorbent 60 is activated, and thus molecules (gas) adsorbed on the getter are desorbed from the getter. Such molecules (that is, gas) desorbed from the getter are discarded through the evacuation space 510, the gas passage 600, the gas passage space 520, and the outlet 700. Therefore, in the evacuating step, the adsorbability of the gas adsorbent 60 is recovered. The evacuation time is set to obtain the evacuated space 50 having a desired degree of vacuum (for example, a degree of vacuum equal to or lower than 0.1 Pa). For example, the evacuation time is set to 120 minutes.

The second melting step is a step of forming the seal 40 enclosing the evacuated space 50 by changing the shape of the partition 420 to form the separator 42 closing the gas passage 600. In the second melting step, the second thermal adhesive is melted once at the predetermined temperature (the second melting temperature) equal to or higher than the second softening point, and thereby the partition 420 is changed in shape to form the separator 42. In more detail, the first glass substrate 200 and the second glass substrate 300 are heated at the second melting temperature for the predetermined time (the second melting time) in the furnace.

The second melting temperature and the second melting time are set to allow the second thermal adhesive to soften to form the separator 42 closing the gas passage 600. A lower limit of the second melting temperature is equal to the second softening point (434° C.). Note that, differently from the first melting step, the purpose of the second melting step is to change the shape of the partition 420, and consequently the second melting temperature is set to be higher than the first melting temperature (440° C.). For example, the second melting temperature is set to 460° C. Additionally, the second melting time is, for example, 30 minutes.

When the separator 42 is formed, the evacuated space 50 is separated from the gas passage space 520. Hence, the vacuum pump cannot evacuate the evacuated space 50. The frame 410 and the separator 42 are heated until the second melting step is finished, and therefore gas may be emitted from the frame 410 and the separator 42. However, gas emitted from the frame 410 and the separator 42 is adsorbed on the gas adsorbent 60 inside the evacuated space 50. Consequently, a decrease in the degree of vacuum of the evacuated space 50 can be suppressed. In summary, it is possible to suppress a decrease in the thermal insulating properties of the glass panel unit 10.

Also in the first melting step, the frame 410 and the separator 42 are heated. Thus, the frame 410 and the separator 42 may emit gas. Gas emitted by the frame 410 and the separator 42 is adsorbed by the gas adsorbent 60, and therefore the adsorbability of the gas adsorbent 60 may decrease due to the first melting step. However, in the evacuating step, the evacuation space 510 is evacuated at the evacuating temperature equal to or higher than the activation temperature of the getter of the gas adsorbent 60 and thereby the adsorbability of the gas adsorbent 60 is recovered. Therefore, the gas adsorbent 60 can adsorb a sufficient amount of gas emitted from the frame 410 and the separator 42 in the second melting step. In other words, it is possible to avoid an undesired situation the gas adsorbent 60 fails to adsorb a sufficient amount of gas emitted from the frame 410 and the separator 42 and thus the degree of vacuum of the evacuated space 50 decreases.

Additionally, in the second melting step, evacuation of the evacuation space 510 through the gas passage 600, the gas passage space 520, and the outlet 700 is continued from the evacuating step. In other words, in the second melting step, the separator 42 closing the gas passage 600 is formed by changing the shape of the partition 420 at the second melting temperature while the evacuation space 510 is evacuated through the gas passage 600, the gas passage space 520, and the outlet 700. By doing so, it is possible to more lower a probability that the degree of vacuum of the evacuated space 50 decreases during the second melting step. Note that, the second melting step does not necessarily include evacuating the evacuation space 510 through the gas passage 600, the gas passage space 520, and the outlet 700.

The above predetermined process includes converting the evacuation space 510 into the evacuated space 50 by evacuating the evacuation space 510 by way of the gas passage 600, the gas passage space 520, and the outlet 700 at a predetermined temperature (evacuating temperature). The evacuating temperature is higher than the activation temperature of the getter of the gas adsorbent 60. Consequently, evacuation of the evacuation space 510 and recovery of the adsorbability of the getter can be performed simultaneously.

The above predetermined process further includes forming the seal 40 enclosing the evacuated space 50 by forming a separator 42 for closing the gas passage 600 by changing a shape of the partition 420 (see FIG. 7). The partition 420 includes the second thermal adhesive. Therefore, the separator 42 can be formed by changing the shape of the partition 420 by once melting the second thermal adhesive at a predetermined temperature (second melting temperature) equal to or higher than the second softening point. Note that, the first melting temperature is lower than the second melting temperature. Consequently, it is possible to prevent the gas passage 600 from being closed due to deformation of the partition 420 in bonding the first glass substrate 200 and the second glass substrate 300 with the frame 410. Note that, the partition 420 may be made of material which is more deformable than that of the frame 410 when melted.

The partition 420 is changed in shape so that the first closing part 4221 closes the first gas passage 610 and the second closing part 4222 closes the second gas passage 620. The separator 42, which is obtained by changing the shape of the partition 420 as described above, separates (spatially) the evacuated space 50 from the gas passage space 520. The separator (second part) 42 and part (first part) 41 of the frame 410 corresponding to the evacuated space 50 constitute the seal 40 enclosing the evacuated space 50.

The evacuated space 50 is obtained by evacuating the evacuation space 510 by way of the gas passage space 520 and the outlet 700 as described above. The evacuated space 50 is hermetically enclosed by the first glass substrate 200, the second glass substrate 300, and the seal 40 completely and thus is separated from the gas passage space 520 and the outlet 700.

Additionally, the seal 40 with a rectangular frame shape is formed. The seal 40 includes the first part 41 and the second part 42. The first part 41 is part of the frame 410 corresponding to the evacuated space 50. In other words, the first part 41 is part of the frame 410 facing the evacuated space 50. The first part 41 has an almost U-shape, and serves as three of four sides of the seal 40. The second part 42 is a separator formed by changing the shape of the partition 420. The second part 42 has an I-shape, and serves as a remaining one of the four sides of the seal 40.

Through the aforementioned hermetically enclosing step, the completed assembly 110 shown in FIG. 6 to FIG. 8 is produced. The completed assembly 110 includes the first glass substrate 200, the second glass substrate 300, the seal 40, the evacuated space 50, the gas passage space 520, the gas adsorbent 60, and the multiple spacers 70. Note that, in FIG. 7, to facilitate understanding of the internal structure only, the first glass substrate 200 is illustrated with part (right and lower part) thereof being cutaway.

The removing step is a step of obtaining the glass panel unit 10 which is part including the evacuated space 50, by removing part 11 including the gas passage space 520 from the completed assembly 110. As shown in FIG. 7, in more detail, the completed assembly 110 taken out from the furnace is cut along the cutting line 900, and thereby is divided into predetermined part (glass panel unit) 10 including the evacuated space 50 and part (unnecessary part) 11 including the gas passage space 520. The unnecessary part 11 mainly includes part 230 of the first glass substrate 200 corresponding to the gas passage space 520, part 320 of the second glass substrate 300 corresponding to the gas passage space 520, and part 411 of the frame 410 corresponding to the gas passage space 520. Note that, in consideration of production cost of the glass panel unit 10, the unnecessary part 11 is preferably as small as possible. FIG. 9 shows removing the unnecessary part 11 from the completed assembly 110.

Cutting is done by an appropriate cutting device. Examples of the cutting device may include a scriber and a laser. By cutting the first glass substrate 200 and the second glass substrate 300 at the same time, the glass panel unit 10 can be cut efficiently. Note that, the shape of the cutting line 900 is set according to the shape of the glass panel unit 10. The glass panel unit 10 is rectangular, and therefore the cutting line 900 is a straight line along the lengthwise direction of the wall separator 42.

Through the aforementioned preparation step, assembling step, hermetically enclosing step, and removing step, the glass panel unit 10 as shown in FIG. 1 and FIG. 2 is produced. The first glass panel 20 is part of the first glass substrate 200 corresponding to the evacuated space 50. The second glass panel 30 is part of the second glass substrate 300 corresponding to the evacuated space 50. The outlet 700 for forming the evacuated space 50 is present in the part 320 of the second glass substrate 300 corresponding to the gas passage space 520, and the evacuation pipe 810 is connected to the part 320. Therefore, the outlet 700 is not present in the second glass panel 30.

An inspection method of glass panel unit is described with reference to the glass panel unit 10 and the method for manufacturing the same which are described above.

The inspection method of the glass panel unit 10 includes determining the degree of vacuum of the evacuated space 50. As described above, the gas adsorbent 60 has properties of changing its color when adsorbing gas. Therefore, an activation state of the gas adsorbent 60 can be checked based on the color thereof. When the gas adsorbent 60 is less active, the degree of vacuum can be determined low. When the gas adsorbent 60 is kept active, the degree of vacuum can be determined high.

The inspection method of glass panel unit allows determining the degree of vacuum of the evacuated space 50 of the glass panel unit 10 even after manufacturing thereof. In manufacturing, it is possible to inspect whether the vacuum state is maintained. For example, after manufacturing the glass panel unit 10, the color of the gas adsorbent 60 is checked. When the color of the gas adsorbent 60 is changed from its original color, it can be inferred that the gas adsorbent 60 has adsorbed gas inside the evacuated space 50 and thus there may be gas inside the evacuated space 50. In this case, it can be determined that the degree of vacuum of the evacuated space 50 is low and thus the vacuum state of the evacuated space 50 is not maintained. The glass panel unit 10 does not have enough thermal insulating properties due to a lack of vacuum and therefore is considered a defective product. In contrast, when the color of the gas adsorbent 60 is identical to its original color, gas is inferred to not exist or not substantially exist inside the evacuated space 50. In this case, it can be determined that the degree of vacuum of the evacuated space 50 is kept high and thus the evacuated space 50 is in the vacuum state. Accordingly, the glass panel unit 10 has thermal insulating properties due to presence of vacuum and therefore is considered a non-defective product. The inspection method of the glass panel unit 10 may be included as one step in the method for manufacturing the glass panel unit 10.

After manufacturing the glass panel unit 10, in some cases the seal 40 may not be stable yet and thus discharge gas. If airtightness of the seal 40 is insufficient, external air is likely to intrude into the evacuated space 50 through a gap between the seal 40 and a glass panel. After manufacturing, the seal 40 may shrink to form a gap. Even in those cases, the above inspection method allows facilitating check of the degree of vacuum. Such a leakage can be checked based on change in color of the gas adsorbent.

The color change of the gas adsorbent 60 may be checked with the naked eyes or by optical means such as color difference measurement and chromaticity measurement. When such check can be done with the naked eyes, the inspection becomes easy. When the color change is checked with an optical measurement device, it can be determined precisely. For example, when there is a large change in the color difference of the gas adsorbent 60, check of the color change becomes easy. Based on the color change of the gas adsorbent 60, deactivation of the gas adsorbent 60 can be checked.

Figure 10:
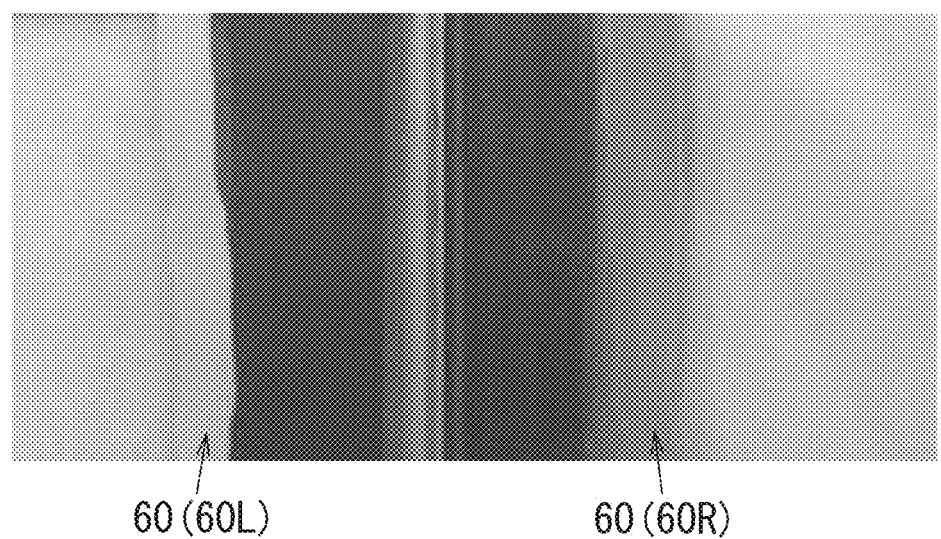
FIG. 10 is a photograph illustrating one example of change in color of the gas adsorbent.

An actual example of the color change of the gas adsorbent 60 is shown. FIG. 10 is a photograph illustrating one example of the color change of the gas adsorbent 60. The getter is a copper ion-exchanged zeolite. To observe changes in color, the gas adsorbents 60 are provided to a surface of a glass panel. The gas adsorbent 60R shown in the right side does not show change in its color (actually, the gas adsorbent 60R has a bluish color). Hence, the gas adsorbent 60R is kept active. In contrast, the gas adsorbent 60L shown in the left side shows a change in its color (actually, the gas adsorbent 60L has a reddish color). The gas adsorbent 60L had its original color identical to the color of the gas adsorbent 60R on the right side. However, the gas adsorbent 60L adsorbed a saturation amount of gas, and thus became inactive to have its color changed. The monochrome shows only a change in a gray value, but actually there is change in a color tone. It is preferable that change in the color be larger. In this actual example, the gas adsorbent 60L shows change in chromaticity before and after change in the color.

The inspection method of the glass panel unit 10 allows determining the degree of vacuum of the evacuated space 50 of the glass panel unit 10 even after a lapse of a predetermined time period. For example, it is possible to determine whether the vacuum state of the glass panel unit 10 is maintained even after it is stored for a predetermined time period. This inspection method can apply to custody of inventory. Additionally, for example, it is possible to check whether the vacuum state is maintained after use of the glass panel unit 10 as a product. In a concrete example, it is possible to check the degree of vacuum of the glass panel unit 10 which is already used as a window.

The glass panel unit 10 can facilitate check of the degree of vacuum based on change in color. It is difficult to check the degree of vacuum of the glass panel unit 10 hermetically enclosed with conventional techniques. For example, there may be a method including inspecting the thermal insulating properties of the glass panel unit to check whether the degree of vacuum is maintained. As for intrusion (leakage) through a gap in the seal 40, check may be done by detecting colored gas intruding. However, these inspection methods are complex and not easy. In contrast, according to the above inspection method of the glass panel unit 10, it is possible to check the degree of vacuum precisely and easily based on change in the color. As apparent from the above, the inspection method of the glass panel unit 10 allows easily determining the degree of vacuum of the evacuated space 50 based on change in the color. Therefore, it is possible to check whether the vacuum state is maintained, and therefore the glass panel unit 10 maintaining the vacuum state can be provided.

Note that, in the above embodiment, the gas adsorbent 60 is linear, but the gas adsorbent 60 may have an appropriate shape. For example, the gas adsorbent 60 may have a shape representing one or more letters and symbols. In a concrete example, the gas adsorbent 60 may have a shape representing a logo. For example, the word "NG" and the symbol "x" may become visible when change in color has occurred. In this case, it is possible to easily understand that there is defect, and check can be facilitated. Especially, the meaning appearing in response to change in color can be easily understood, and therefore customers and users can easily make determination.

Hereinafter, optional modifications relating to the glass panel unit are described. In the description relating to the modifications, the reference sings in parentheses of corresponding components are introduced.

In the above embodiment, the glass panel unit (10) is rectangular, but the glass panel unit (10) may have a desired shape such as a circular shape and a polygonal shape. Stated differently, each of the first glass panel (20), the second glass panel (30), and the seal (40) may not be rectangular and may have a desired shape such as a circular shape and a polygonal shape. Note that, the shapes of the first glass substrate (200), the second glass substrate (300), the frame (410), and, the separator (42) may not be limited to the shapes described in the explanation of the above embodiment, and may have such shapes that the glass panel unit (10) can have a desired shape. Note that, the shape and size of the glass panel unit (10) may be determined in consideration of application of the glass panel unit (10).

Additionally, the first face and the second face, of the body (21) of the first glass panel (20) may not be limited to flat faces. Similarly, the first face and the second face, of the body (31) of the second glass panel (30) may not be limited to flat faces.

Additionally, the body (21) of the first glass panel (20) and the body (31) of the second glass panel (30) may not have the same plan shape and plan size. Further, the body (21) and the body (31) may not have the same thickness. Furthermore, the body (21) and the body (31) may not be made of the same material. Similarly, the glass plate (210) of the first glass substrate (200) and the glass plate (310) of the second glass substrate (300) may not have the same plan shape and plan size. Further, the glass plate (210) and the glass plate (310) may not have the same thickness. Furthermore, the glass plate (210) and the glass plate (310) may not be made of the same material.

Additionally, the seal (40) may not have the same plan shape with the first glass panel (20) and the second glass panel (30). Similarly, the frame (410) may not have the same plan shape with the first glass substrate (200) and the second glass substrate (300).

Additionally, the first glass panel (20) may include a coating which has desired physical properties and is formed on the second face of the body (21). Alternatively, the first glass panel (20) may not include the coating (22). In other words, the first glass panel (20) may be constituted by the body (21) only.

Additionally, the second glass panel (30) may include a coating with desired physical properties. For example, the coating may include at least one of thin films formed on the first face and the second face of the body (31) respectively. Examples of the coating may include a film reflective for light with a specified wavelength (for example, infrared reflective film and ultraviolet reflective film).

In the above embodiment, the frame (410) is made of the first thermal adhesive. However, the frame (410) may include other component such as a core, in addition to the first thermal adhesive. Stated differently, it is sufficient that the frame (410) includes the first thermal adhesive. In the above embodiment, the frame (410) is formed to surround an almost entire region on the second glass substrate (300). However, it is sufficient that the frame (410) is formed to surround a predetermined region on the second glass substrate (300). In other words, there is no need to form the frame (410) so as to surround an almost entire region on the second glass substrate (300). Alternatively, the completed assembly (110) may include two or more frames (410). In other words, the completed assembly (110) may include two or more inside spaces (500). In this case, it is possible to produce two or more glass panel units (10) from one completed assembly (110).

In the above embodiment, the partition (420) is made of the second thermal adhesive. However, the partition (420) may include other component such as a core, in addition to the second thermal adhesive. Stated differently, it is sufficient that the partition (420) includes the second thermal adhesive. Further, in the above embodiment, the partition (420) has its opposite end not connected to the frame (410). And, gaps between the opposite ends of the partition (420) and the frame (410) define the gas passages (610, 620). However, the partition (420) may have only one of its opposite ends not connected to the frame (410). In this case, there is one gas passage (600) between the partition (420) and the frame (410). Alternatively, the partition (420) may have its opposite end both connected to the frame (410). In this case, the gas passage (600) may be a through hole formed in the partition (420). Alternatively, the gas passage (600) may be a gap between the partition (420) and the first glass substrate (200). Alternatively, the partition (420) may be defined as a set of two or more partitions spaced from each other. In this case, the gas passage (600) may be a gap between adjacent two of the two or more partitions.

In the above embodiment, the inside space (500) is divided into one evacuation space (510) and one gas passage space (520). Note that, the inside space (500) may be divided into one or more evacuation spaces (510) and one or more gas passage spaces (520). When the inside space (500) includes two or more evacuation spaces (510), it is possible to produce two or more glass panel units (10) from one completed assembly (110).

In the above embodiment, the second thermal adhesive is identical to the first thermal adhesive, and the second softening point is equal to the first softening point. However, the second thermal adhesive may be different material from the first thermal adhesive. For example, the second thermal adhesive may have the second softening point different from the first softening point of the first thermal adhesive. In such a case, the second softening point may be preferably higher than the first softening point. In this case, the first melting temperature can be set to be equal to or higher than the first softening point and lower than the second softening point. By doing so, it is possible to suppress undesired deformation of the partition 420 in the first melting step.

Additionally, each of the first thermal adhesive and the second thermal adhesive may not be limited to glass frit, but may be selected from low-melting-point metal, hot-melt adhesive, and the like, for example.

In the above embodiment, a furnace is used to heat the frame (410), the gas adsorbent (60), and the partition (420). However, such heating can be done with appropriate heating means. Examples of the heating means may include a laser and a thermally conductive plate connected to a heat source.

In the above embodiment, the gas passage (600) includes the two gas passages (610, 620). However, the gas passage (600) may include only one gas passage or may include three or more gas passages. Further, the shape of the gas passage (600) may not be limited in particular.

In the above embodiment, the outlet (700) is formed in the second glass substrate (300). However, the outlet (700) may be formed in the glass plate (210) of the first glass substrate (200) or may be formed in the frame (410). In summary, the outlet (700) may be allowed to be formed in the unnecessary part (11).

In the above embodiment, the getter of the gas adsorbent (60) is an evaporative getter. However, the getter may be a non-evaporative getter. When the non-evaporative getter has a temperature equal to or higher than a predetermined temperature (the activation temperature), adsorbed molecules intrudes into an inside of the getter, and thus the adsorbability can be recovered. In contrast to the evaporative getter, the adsorbed molecules are not desorbed. Therefore, after the non-evaporative getter has adsorbed an amount of molecules equal to or more than a certain amount, the adsorbability is no longer recovered even if the getter is heated up to a temperature equal to or higher than the activation temperature.

In the above embodiment, the gas adsorbent (60) has an elongated shape, but may have another shape. Additionally, the gas adsorbent (60) may not be necessarily positioned at the end of the evacuated space (50). Further, in the above embodiment, the gas adsorbent (60) may be formed by applying a liquid containing a powder of the getter (for example, a dispersion liquid prepared by dispersing a powder of the getter in a liquid, and a solution prepared by dissolving a powder of the getter in a liquid). However, the gas adsorbent (60) may include a substrate and the getter fixed to the substrate. This type of the gas adsorbent (60) may be formed by immersing a substrate in a liquid containing the getter and drying it. Note that, the substrate may have a desired shape, but may be an elongated rectangular shape, for example.

Alternatively, the gas adsorbent (60) may be a film formed entirely or partially on the surface (first face) of the glass plate (310) of the second glass substrate (300). This type of the gas adsorbent (60) may be formed by coating the surface (first face) of the glass plate (310) of the second glass substrate (300) with a liquid containing a powder of the getter.

Alternatively, the gas adsorbent (60) may be included in the spacer (70). For example, the spacer (70) may be made of material containing the getter, and thereby the spacer (70) including the gas adsorbent (60) can be obtained.

Alternatively, the gas adsorbent (60) may be solid material made of the getter. This gas adsorbent (60) tends to have a large size, and thus cannot be placed between the first glass substrate (200) and the second glass substrate (300) in some cases. In such cases, the glass plate (310) of the second glass substrate (300) may be formed to include a recess, and the gas adsorbent (60) may be placed in this recess.

Alternatively, the gas adsorbent (60) may be preliminarily placed in a package to suppress the getter from adsorbing molecules. In this case, the package may be broken after the second melting step to expose the gas adsorbent (60) to the evacuated space (50).

In the above embodiment, the glass panel unit (10) includes the multiple spacers (70). However, the glass panel unit (10) may include a single spacer (70). Alternatively, the glass panel unit (10) may not include any spacer (70).

The present embodiment relates to forming the glass panel unit (10) not including an outlet by removing the unnecessary part (11). In one case, the glass panel unit (10) may include an outlet. In this case, at least one of the first glass panel (20) and the second glass panel (30) may include an outlet. The outlet is closed to keep the evacuated space (50) in the vacuum state. When at least one of the first glass panel (20) and the second glass panel (30) includes such an outlet, the outlet may be closed with a cap. However, to improve an appearance, it is preferable that the glass panel unit (10) do not include the outlet.

The invention claimed is:

1. An inspection method for a glass panel unit comprising a first glass panel;
   a second glass panel placed opposite the first glass panel;
   a seal with a frame shape placed between the first glass panel and the second glass panel to hermetically bond the first glass panel and the second glass panel to each other;
   an evacuated space enclosed by the first glass panel, the second glass panel, and the seal; and
   a gas adsorbent placed in the evacuated space and including a getter, the gas adsorbent being visible through at least one of the first glass panel and the second glass panel, and having properties of changing its color when adsorbing gas, the inspection method comprising steps of:
   observing an original color of the gas adsorbent at a first time when the gas adsorbent is first placed into the evacuated space through at least one of the first and second glass panels;
   observing a color of the gas adsorbent at a second time through at least one of the first and second glass panels, wherein the second time is after the first time by a predetermined time period; and
   determining a degree of vacuum of the evacuated space to be low and the gas adsorbent to be inactive when the color of the gas adsorbent at the second time is changed from the original color at the first time.

2. The inspection method of claim 1, wherein the degree of vacuum of the evacuated space is determined to be lower than 0.1 Pa when the color of the gas adsorbent at the second time is changed from the original color at the first time.

* * * * *